(12) United States Patent  
Huang et al.

(10) Patent No.: US 10,341,586 B2  
(45) Date of Patent: Jul. 2, 2019

(54) VISIBLE LIGHT IMAGE AND INFRARED IMAGE FUSION PROCESSING SYSTEM AND FUSION METHOD

(71) Applicant: WUHAN GUIDE INFRARED CO., LTD., Wuhan, Hubei Province (CN)

(72) Inventors: Li Huang, Wuhan (CN); Daoqing Lin, Wuhan (CN); Peng Wang, Wuhan (CN); Hanlin Zhou, Wuhan (CN); Fei Liu, Wuhan (CN); Xiaomin Sun, Wuhan (CN)

(73) Assignee: WUHAN GUIDE INFRARED CO., LTD., Wuhan, Hubei Province (CN)

( * ) Notice: Subject to any disclaimer, the term of this patent is extended or adjusted under 35 U.S.C. 154(b) by 0 days.

(21) Appl. No.: 15/750,359

(22) PCT Filed: Mar. 23, 2016

(86) PCT No.: PCT/CN2016/077134  
§ 371 (c)(1),  
(2) Date: Feb. 5, 2018

(87) PCT Pub. No.: WO2017/020595  
PCT Pub. Date: Feb. 9, 2017

(65) Prior Publication Data  
US 2018/0227509 A1    Aug. 9, 2018

(30) Foreign Application Priority Data  
Aug. 5, 2015   (CN) .......................... 2015 1 0473667

(51) Int. Cl.  
*H04N 5/33* (2006.01)  
*G06T 5/50* (2006.01)  
(Continued)

(52) U.S. Cl.  
CPC .............. *H04N 5/332* (2013.01); *G06T 5/002* (2013.01); *G06T 5/004* (2013.01); *G06T 5/50* (2013.01);  
(Continued)

(58) Field of Classification Search  
CPC ........ H04N 5/332; H04N 5/002; H04N 5/004; H04N 5/50; H04N 5/217; H04N 5/2254; H04N 9/646  
(Continued)

(56) References Cited

U.S. PATENT DOCUMENTS 7,652,251 B1    1/2010  King

FOREIGN PATENT DOCUMENTS

CN    101510007 A    8/2009  
CN    102982518 A    3/2013  
(Continued)

OTHER PUBLICATIONS

CN104364800 Machine Translation (Year: 2015).*

*Primary Examiner* — Nguyen T Truong  
(74) *Attorney, Agent, or Firm* — Muncy, Geissler, Olds & Lowe, P.C.

(57) ABSTRACT

The invention relates to a visible light image and infrared image fusion processing system and a fusion method. The fusion processing system comprises an image acquisition module, an image fusion module and an image display module, wherein the image fusion module is connected with the image acquisition module and the image display module. By adoption of the fusion method, the fusion ratio of a visible light image to an infrared image can be adjusted according to requirements, and detailed images are filtered and compared and then enhanced, so that detail information of a fused image is improved, and noise interference is avoided. Furthermore, fusion weights of the visible light  
(Continued)

image and the infrared image and the detail enhancement degree can be flexibly controlled through external parameter adjustment, and thus various display requirements are met.

2 Claims, 2 Drawing Sheets

(51) Int. Cl.
  *G06T 5/00* (2006.01)
  *H04N 5/217* (2011.01)
  *H04N 5/225* (2006.01)
  *H04N 9/64* (2006.01)
(52) U.S. Cl.
  CPC ........... *H04N 5/217* (2013.01); *H04N 5/2254* (2013.01); *H04N 9/646* (2013.01); *G06T 2207/10024* (2013.01); *G06T 2207/10048* (2013.01); *G06T 2207/20024* (2013.01); *G06T 2207/20221* (2013.01)
(58) Field of Classification Search
  USPC ........................................................ 348/164
  See application file for complete search history.

(56) References Cited

FOREIGN PATENT DOCUMENTS

| CN | 104364800 A | 2/2015 |
| CN | 105069768 A | 11/2015 |

\* cited by examiner

VISIBLE LIGHT IMAGE AND INFRARED IMAGE FUSION PROCESSING SYSTEM AND FUSION METHOD

BACKGROUND OF THE INVENTION

Technical Field

The invention belongs to the field of digital image processing, and particularly relates to a visible light image and infrared image fusion processing system and fusion method.

Description of Related Art

In the field of digital image processing, imaging principles of various image sensors are different, core devices used for photoelectric conversion respond to wavelengths within different ranges, and a single image sensor cannot meet various imaging requirements.

BRIEF SUMMARY OF THE INVENTION

To overcome the imaging defects of a single image sensor, the invention provides a visible light image and infrared image fusion processing system and a fusion method, which can meet different imaging requirements for different sensors under different conditions; detailed images which are denoised and filtered are enhanced by screening out extreme values, so that detail defects and loud noise of a traditional fusion system are avoided. By adoption of the visible light image and infrared image fusion processing system and the fusion method, the fusion ratio of visible light images to infrared images can be adjusted according to requirements, images are enhanced in detail, and thus detailed information of fused images is improved.

The technical solution of the invention is as follows:

A visible light image and infrared image fusion processing system comprises an image acquisition module, an image fusion module and an image display module, wherein the image fusion module is connected with the image acquisition module and the image display module respectively;

The image acquisition module comprises an infrared image acquisition device and a visible light image acquisition device, and the image fusion module is used for fusion processing of an infrared image and a visible light image, so that a fused image is obtained; the fused image is transmitted to a display device to be displayed through the image display module.

The lenses of the infrared image acquisition device and the visible light image acquisition device are mounted at the same position, and optical axes of the lenses are in the same direction and in parallel; the infrared image acquisition device and the visible light image acquisition device need to synchronously output video images frame by frame, and the field angle range is registered according to the resolution, so that the images have the same scene area; the area where registered images are selected is preset, and thus image registration can be achieved without complex calculation.

The fusion method based on the visible light image and infrared image fusion processing system comprises the following steps:

Step 1: the format of the selected target area of a visible light image is transformed, so that the color image is converted into a grayscale image or only a luminance component image of the color image is selected;

Step 2: the visible grayscale image or the luminance component image is low-pass filtered, so that a low-frequency component image of the visible light image is obtained; then the difference image data between the non-filtered visible grayscale image and the visible low-frequency component image is calculated, so that a visible high-frequency component image is obtained;

Step 3: an infrared image is low-pass filtered, so that a low-frequency component image of the infrared image is obtained; then the difference image data between a non-filtered infrared grayscale image and the low-frequency component image of the infrared image is calculated, so that a high-frequency component image of the infrared image is obtained;

Step 4: pseudo-color enhancement of the low-frequency component image of the infrared image is achieved through the table look-up method, and the luminance component in a pseudo-color image is extracted;

Step 5: the low-frequency component images are fused, specifically, the weights of the low-frequency luminance component of the infrared image and the low-frequency component of the visible grayscale image are summed, and the weight sum of each pixel is one;

For keeping the target focused by human eyes unaffected, during fusion, the weight value of each pixel is adaptively calculated according to scene information based on the following principles: for the first principle, the value range of the luminance component image of the infrared low-frequency image is [0, 255], and the value range of the low-frequency component image of the visible light image is also [0, 255]; for the second principle, when the focused scene mainly depends on the infrared image, if the grayscale value of the luminance component image of the infrared low-frequency image is greater than that of the low-frequency component image of the visible light image, the weight value of each pixel of the infrared image is one, otherwise, the weight value of each pixel of the infrared image is set according to parameters input from the outside; for the third principle, when the focused scene mainly depends on the visible light image, if the grayscale value of the luminance component image of the infrared low-frequency image is greater than that of the low-frequency component image of the visible light image, the weight value of the infrared image is set according to parameters input from the outside, otherwise, the weight value of the infrared image is zero; for the fourth principle, no matter whether the focused scene mainly depends on the infrared image or the visible light image, the weight sum of the infrared image and the visible light image is one all the time.

Step 6: the high-frequency component images are enhanced, specifically, the enhancement degree of the high-frequency component image of the infrared image and the high-frequency component image of the visible light image is adjusted through control parameters;

Step 7: the enhanced high-frequency component image of the infrared image and the enhanced visible high-frequency component image are superposed on the fused low-frequency component image obtained in Step 5, and thus a fused luminance component image is obtained;

Step 8: the luminance component image in the infrared pseudo-color image is replaced with fused luminance component image, and thus a final fused image is obtained.

Step 6 specifically comprises the following sub-steps:

Sub-step 6.1: for weakening noise of detailed images, the high-frequency images need to be bilaterally filtered before the detailed images are enhanced, and thus noise is removed;

Sub-step 6.2: the detail value of the infrared image and the detail value of the visible light image are compared; if the pixel values of the detailed images are both positive values, the greater one is used as the final detail value; if the pixel values of the detailed images are both negative values, the smaller one is used as the final detail value; else the greater absolute value is used as the final detail value, and thus a new detailed image is obtained;

Sub-step 6.3: the detailed image is enhanced through an external enhancement parameter, so that an enhanced high-frequency component image is obtained.

The visible light image and infrared image fusion processing system and the fusion method of the invention have the beneficial effects that the fusion ratio of the visible light image to the infrared image can be adjusted according to focusing requirements, and the detailed images are filtered and compared and then enhanced, so that detail information of the fused image is improved, and noise interference is avoided. Furthermore, the fusion weights of the visible light image and the infrared image and the detail enhancement degree can be flexibly controlled through external parameter adjustment, and thus various display requirements are met.

DETAILED DESCRIPTION OF THE INVENTION

A further description of the invention is given with the accompanying drawings.

Figure 1:
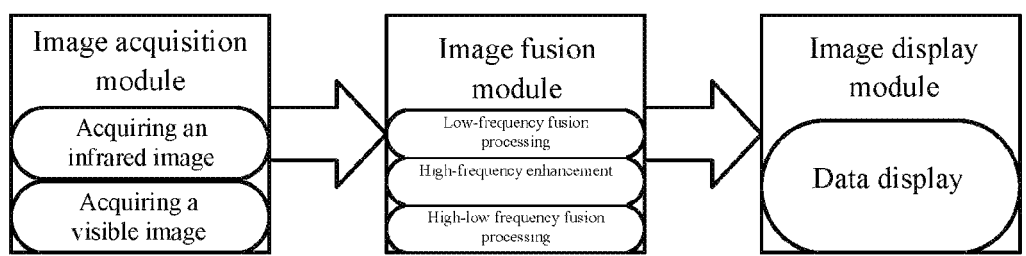
FIG. 1 is a schematic diagram of a system of the invention.

As is shown in FIG. 1, the present invention comprises an image acquisition module, an image fusion module and an image display module, wherein the image fusion module is connected with the image acquisition module and the image display module respectively; the image acquisition module comprises an infrared image acquisition device and a visible light image acquisition device, and the image fusion module is used for fusion processing of an infrared image and a visible light image, so that a fused image is obtained; the fused image is transmitted to a display device to be displayed through the image display module.

The image acquisition module is composed of the infrared image acquisition device and the visible light image acquisition device, lenses of the infrared image acquisition device and the visible light image acquisition device must be mounted at the same position, and optical axes of the lenses are in the same direction and in parallel; the different image acquisition devices need to synchronously output video images frame by frame, and the field angle range is registered according to the resolution, so that the images have the same scene area; the area where registered images are selected can be preset, and thus image registration can be achieved without complex calculation. The image acquisition module transmits acquired infrared image data and visible light image data to the image fusion processing module.

Figure 2:
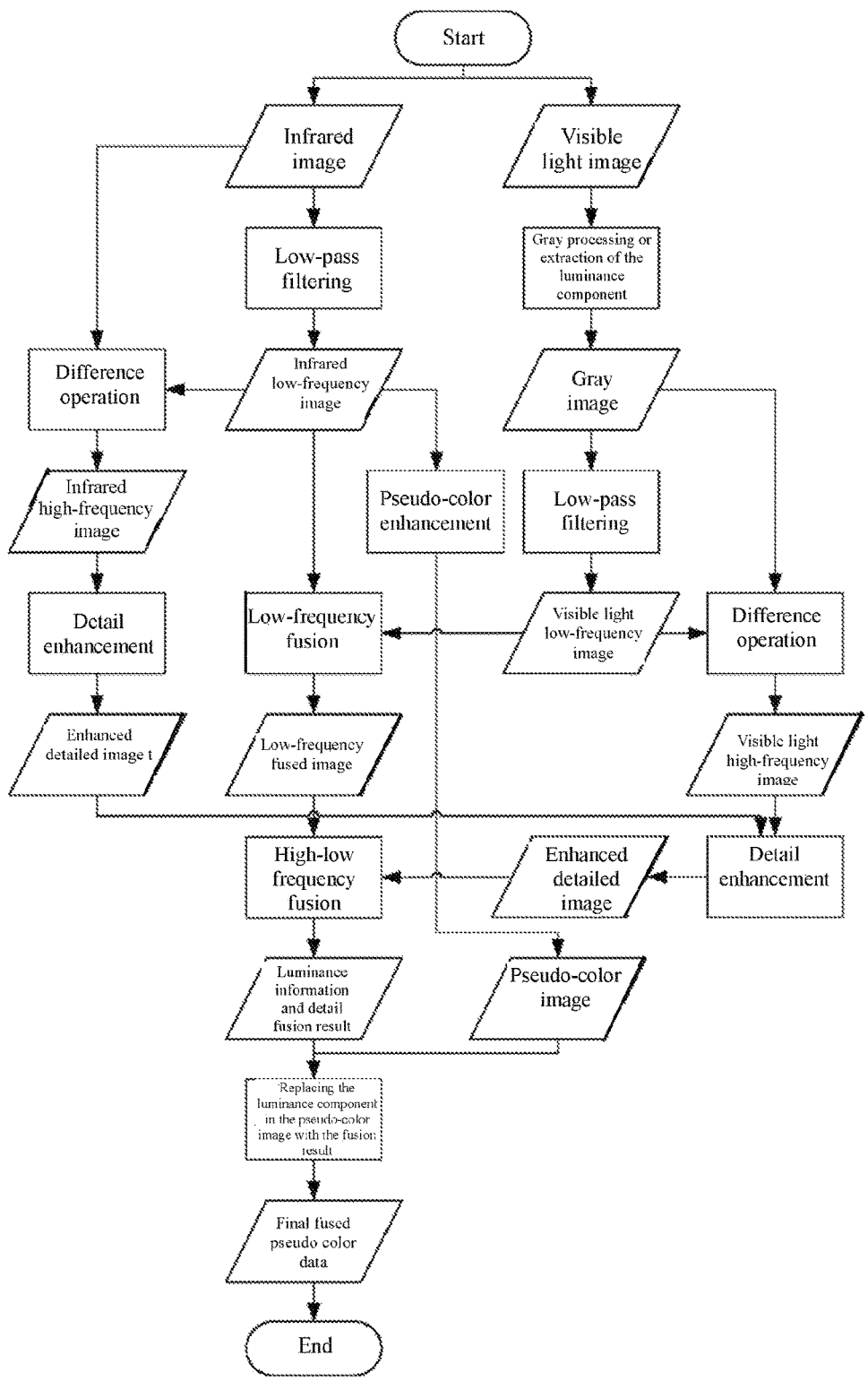
FIG. 2 is a flow diagram of an image fusion method of the invention.

Image fusion of areas of interest of the selected infrared and visible light images is achieved by the image fusion module through software operation, the specific realization process is shown in FIG. 2, and the fusion method comprises the following detailed steps:

Step 1: the format of the selected target area of a visible light image is transformed, so that the color image is converted into a grayscale image or only a luminance component image of the color image is selected;

Step 2: the visible grayscale image or the luminance component image is low-pass filtered, so that a low-frequency component image of the visible light image is obtained; then the difference image data between the non-filtered visible grayscale image and the visible low-frequency component image is calculated, so that a visible high-frequency component image is obtained;

Step 3: an infrared image is low-pass filtered, so that a low-frequency component image of the infrared image is obtained; then the difference between a non-filtered infrared grayscale image and the low-frequency component image of the infrared image is calculated, so that a high-frequency component image of the infrared image is obtained;

Step 4: the pseudo-color reality augmentation of the low-frequency component image of the infrared image is achieved through the table look-up method, and the luminance component in a pseudo-color image is extracted;

Step 5: the low-frequency component images are fused, specifically, the weights of the low-frequency luminance component of the infrared image and the low-frequency component of the visible grayscale image are summed, and the weight sum of each pixel is one;

For keeping the target focused by human eyes unaffected, during fusion, the weight value of each pixel is adaptively calculated according to scene information based on the following principles: for the first principle, the value range of the luminance component image of the infrared low-frequency image is [0, 255], and the value range of the low-frequency component image of the visible light image is also [0, 255]; for the second principle, when the focused scene mainly depends on the infrared image, if the grayscale value of the luminance component image of the infrared low-frequency image is greater than that of the low-frequency component image of the visible light image, the weight value of each pixel of the infrared image is one, otherwise, the weight value of each pixel of the infrared image is set according to parameters input from the outside; for the third principle, when the focused scene mainly depends on the visible light image, if the grayscale value of the luminance component image of the infrared low-frequency image is greater than that of the low-frequency component image of the visible light image, the weight value of the infrared image is set according to parameters input from the outside, otherwise, the weight value of the infrared image is zero; for the fourth principle, no matter whether the focused scene mainly depends on the infrared image or the visible light image, the weight sum of the infrared image and the visible light image is one all the time.

Step 6: the high-frequency component images are enhanced, specifically, the enhancement degree of the high-frequency component image of the infrared image and the high-frequency component image of the visible light image is adjusted through control parameters, and this step specifically comprises the following sub-steps:

Sub-step 6.1: for weakening noise of detailed images, the high-frequency images need to be bilaterally filtered before the detailed images are enhanced, and thus noise is removed;

Sub-step 6.2: the detail value of the infrared image and the detail value of the visible light image are compared; if the pixel values of the detailed images are both positive values, the greater one is used as the final detail value; if the pixel values of the detailed images are both negative values, the smaller one is used as the final detail value; else the greater absolute value is used as the final detail value, and thus a new detailed image is obtained;

Sub-step 6.3: the detailed image is enhanced through an external enhancement parameter, so that an enhanced high-frequency component image is obtained.

Step 7: the enhanced high-frequency component image of the infrared image and the enhanced visible high-frequency component image are superposed on the fused low-frequency component image obtained in Step 5, and thus a fused luminance component image is obtained;

Step 8: the luminance component in the infrared pseudo-color image is replaced with fused luminance component image, and thus a final fused image is obtained.

What is claimed is:

1. A fusion method, comprising, providing a visible light image and infrared image fusion processing system, comprising an image acquisition module, an image fusion module and an image display module, wherein the image fusion module is connected with the image acquisition module and the image display module respectively; and wherein the image acquisition module comprises an infrared image acquisition device and a visible light image acquisition device, and the image fusion module is used for fusion processing of an infrared image and a visible light image to obtain a fused image; the image display module transmits the fused image to a display device for display, wherein lenses of the infrared image acquisition device and the visible light image acquisition device are mounted at the same position, and optical axes of the lenses are in the same direction and in parallel;

wherein the infrared image acquisition device and the visible light image acquisition device need to synchronously output video images frame by frame, and the field angle range is registered according to the resolution, so that the images have the same scene area; and wherein the area where registered images are selected is preset, and thus image registration can be achieved without complex calculation, wherein the fusion method also comprises the following steps:

Step 1: transforming the selected target region of the visible light image into a format, converting the color image into a grayscale image or selecting only the luminance component image of the color image;

Step 2: filtering at a low-pass the grayscale image or the luminance component of the visible light to obtain the low-frequency component image of the visible light image; and then performing the difference calculation between the non-filtered visible grayscale image and the visible low-frequency component image to obtain a visible high-frequency component image;

Step 3: filtering at a low pass the infrared image, to obtain a low-frequency component image of the infrared image; then performing the difference calculation between the non-filtered infrared grayscale image and the low-frequency component image of the infrared image to obtain a high-frequency component image of the infrared image;

Step 4: Using the look-up table method to realize the pseudo-color enhancement reality of the low frequency component of the infrared image and extracting the luminance component of the pseudo-color image;

Step 5: Fusing the low-frequency components of the image, and performing sum of the weights of the low-frequency luminance component of the infrared image and the low-frequency component of the visible grayscale image, and the weight sum of each pixel is one;

Step 6: enhancing the high-frequency component images, and adjusting the high-frequency component image of the visible light image and the enhancement degree of the high-frequency component image of the infrared image by control parameters;

Step 7: superposing the enhanced high-frequency component image of the infrared image and the enhanced visible high-frequency component image on the fused low-frequency component image obtained in Step 5 to obtain a fused luminance component image;

Step 8: replacing the luminance component in the infrared pseudo-color image with the fused luminance component image, to obtain the final fused image.

2. The fusion method based on the visible light image and infrared image fusion processing system according to claim 1, wherein step 6 specifically comprises the following sub-steps:

Sub-step 6.1: for weakening noise of detailed images, filtering bilaterally the high-frequency images before enhancing the detailed images to remove noise;

Sub-step 6.2: comparing the detail value of the infrared image and the detail value of the visible light image; if the pixel values of the detailed images are both positive values, the greater one is used as the final detail value; if the pixel values of the detailed images are both negative values, the smaller one is used as the final detail value, and thus obtaining a new detailed image;

Sub-step 6.3: enhancing the detailed image by an external enhancement parameter to obtain an enhanced high-frequency component image.

* * * * *